US009411328B2

(12) United States Patent  
Morioka et al.

(10) Patent No.: US 9,411,328 B2
(45) Date of Patent: Aug. 9, 2016

(54) REMOTE CONTROL DEVICE

(71) Applicant: TOTO, Ltd., Kitakyushu-shi, Fukuoka (JP)

(72) Inventors: Satoko Morioka, Kitakyushu (JP); Masami Yamanaka, Kitakyushu (JP)

(73) Assignee: TOTO, Ltd., Kitakyushu-shi, Fukuoka (JP)

( * ) Notice: Subject to any disclaimer, the term of this patent is extended or adjusted under 35 U.S.C. 154(b) by 51 days.

(21) Appl. No.: 14/623,222

(22) Filed: Feb. 16, 2015

(65) Prior Publication Data

US 2015/0234371 A1 Aug. 20, 2015

(30) Foreign Application Priority Data

Feb. 17, 2014 (JP) ................................. 2014-027263

(51) Int. Cl.
*E03D 9/08* (2006.01)
*G05B 15/02* (2006.01)

(52) U.S. Cl.
CPC . *G05B 15/02* (2013.01); *E03D 9/08* (2013.01)

(58) Field of Classification Search
CPC .................................. G05B 15/02; E03D 9/08
USPC ......................................................... 4/420.4
See application file for complete search history.

(56) References Cited

U.S. PATENT DOCUMENTS

| 2003/0140407 | A1 | 7/2003 | Matsumoto et al. | |
| 2005/0246828 | A1* | 11/2005 | Shirai | E03D 9/08 4/420.4 |
| 2006/0207006 | A1* | 9/2006 | Koga | E03D 9/08 4/420.4 |
| 2008/0012723 | A1 | 1/2008 | Wang | |
| 2011/0252556 | A1 | 10/2011 | Park et al. | |
| 2011/0310029 | A1 | 12/2011 | Uttermann et al. | |

FOREIGN PATENT DOCUMENTS

| EP | 2378016 A1 | 10/2011 |
| JP | H05-109339 A | 4/1993 |
| JP | 3056852 U | 3/1999 |
| JP | 2003-337148 A | 11/2003 |
| JP | 2005-323991 A | 11/2005 |
| JP | 2006-009280 A | 1/2006 |

* cited by examiner

*Primary Examiner* — Tuan N Nguyen
(74) *Attorney, Agent, or Firm* — Banner & Witcoff, Ltd.

(57) ABSTRACT

A remote control device includes operation buttons, detectors, a power generator, a controller, and an output unit. The operation buttons are movable between an ordinary position and a lowermost position and are configured to move from the ordinary position to the lowermost position in response to a push operation. The detectors are configured to detect the respective push operation of the operation buttons. The power generator is configured to generate a power in response to the push operation. The controller is driven by the power. The controller is configured to determine the pushed operation button based on a detection result of the detectors. The controller remotely controls a toilet device by transmitting a wireless signal toward the toilet device. The wireless signal corresponds to the determined operation button. The output unit is configured to produce an output when the power generator has generated the power.

5 Claims, 11 Drawing Sheets

REMOTE CONTROL DEVICE

CROSS-REFERENCE TO RELATED APPLICATIONS

This application is based upon and claims the benefit of priority from Japanese Patent Application No. 2014-027263, filed on Feb. 17, 2014; the entire contents of which are incorporated herein by reference.

FIELD

Embodiments described herein relate generally to a remote control device.

BACKGROUND

There is known a remote control device for remotely controlling electronic equipment. For instance, there is known a remote control device for instructing a toilet device to jet water for toilet flushing and sanitary washing. For instance, Patent Document 1 proposes such a remote control device including a power generator for generating power in response to a push operation of an operation button. The electric power generated by the power generator is used to communicate with a toilet device.

The remote control device including a power generator does not need wiring of signal lines with the toilet device and wiring of power supply. This facilitates installation. Furthermore, there is also no need to exchange batteries. Thus, ease of maintenance can also be improved relative to a battery-powered remote control device. For instance, toilet devices in public facilities are installed in a large number and used frequently. Maintenance such as battery exchange for such toilet devices costs the administrator much time and effort. Thus, the remote control device including a power generator is promising for application to toilet devices in public facilities.

However, the problem of the remote control device of Patent Document 1 is that a sufficient amount of power generation cannot be obtained in the case of a small operation amount of the push operation of the operation button. When a sufficient amount of power generation cannot be obtained, the transmission section cannot be driven. Then, the toilet device cannot be remotely controlled. Accordingly, the remote control device including a power generator is desired to cause the user to operate the operation button appropriately.

SUMMARY

According to one embodiment, a remote control device includes a plurality of operation buttons, a plurality of detectors, a power generator, a controller, and an output unit. The operation buttons are movable between an ordinary position and a lowermost position and are configured to move from the ordinary position to the lowermost position in response to a push operation. The detectors are associated respectively with the operation buttons and are configured to detect the respective push operation of the operation buttons. The power generator is configured to generate a power in response to the push operation of one of the operation buttons. The controller is driven by the power from the power generator. The controller is configured to determine the pushed operation button based on a detection result of each of the detectors. The controller remotely controls a toilet device by transmitting a wireless signal toward the toilet device. The wireless signal corresponds to the determined operation button. The output unit is configured to produce an output when the power generator has generated the power.

DETAILED DESCRIPTION

Figure 1A:
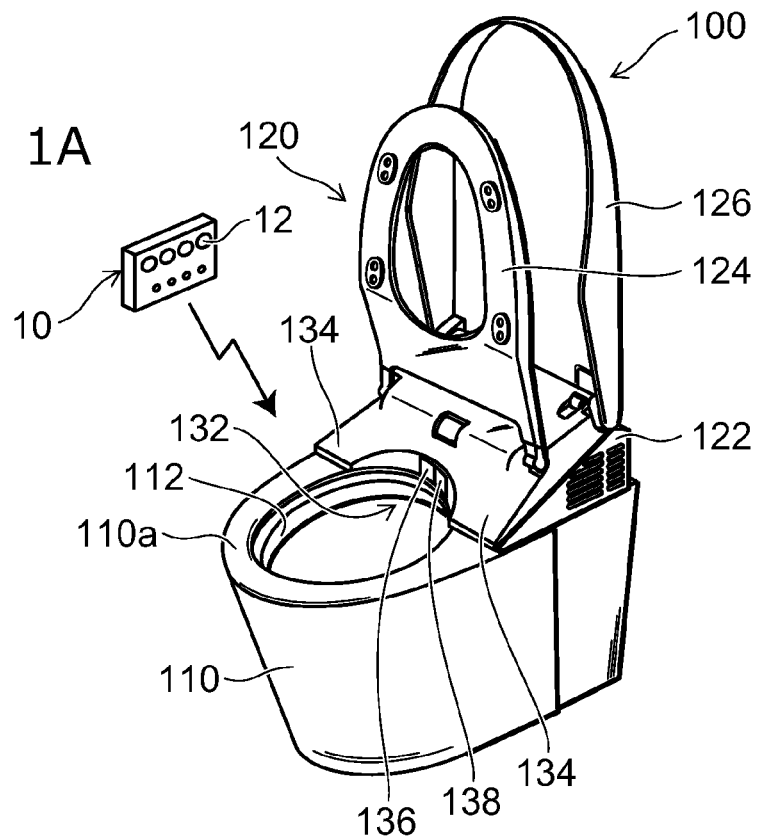
FIGS. 1A and 1B are perspective views schematically showing a remote control device according to an embodiment of the invention.

A first aspect of the invention is a remote control device comprising a plurality of operation buttons being movable to an ordinary position and a lowermost position and configured to move from the ordinary position to the lowermost position in response to a push operation. The remote control device further includes a plurality of detectors associated respectively with the plurality of operation buttons and configured to detect the respective push operation of the plurality of operation buttons. The remote control device further includes a power generator configured to generate power in response to the push operation of one of the plurality of operation buttons. The remote control device further includes a controller driven by the power from the power generator. The controller is configured to determine the pushed operation button based on a detection result of each of the detectors. The controller remotely controls a toilet device by transmitting a wireless signal toward the toilet device. The wireless signal corresponds to the determined operation button. The remote control device further includes an output unit configured to produce output when the power generator has generated power.

This remote control device can cause the user to recognize that the power generator has generated power by the output of the output unit. In other words, the remote control device can cause the user to recognize that the operation button has been appropriately operated. Thus, the remote control device can cause the user to operate the operation button reliably. This can suppress failure to transmit a wireless signal contrary to the user's intention for lack of the operation amount of the operation button. Thus, it is possible to provide a remote control device having usability similar to conventional remote control devices such as wired and battery-powered remote control devices.

A second aspect of the invention is a remote control device according to the first aspect, wherein the output unit outputs a click feeling to the pushed operation button.

This remote control device can convey a tactile feeling to the user indicating that the power generator has generated power. The remote control device can cause the user to recognize appropriately that the power generator has generated power.

A third aspect of the invention is a remote control device according to the first or second aspect, wherein the output unit outputs a sound.

This remote control device can cause the user to recognize appropriately that the power generator has generated power.

A fourth aspect of the invention is a remote control device according to the third aspect, wherein the toilet device includes a nozzle for jetting water toward a human body private part, and the sound outputted by the output unit includes a frequency component having higher sound pressure than a sound during toilet flushing of the toilet device and a jet sound of the nozzle.

This remote control device can cause the user to recognize appropriately the sound outputted by the output unit even at the time of toilet flushing and nozzle operation. The remote control device can cause the user to operate the operation button reliably even at the time of toilet flushing and nozzle operation.

A fifth aspect of the invention is a remote control device according to one of the first to fourth aspects, wherein the plurality of detectors detect the push operation before power generation of the power generator, and do not send a notice when the push operation is detected.

This remote control device can suppress that the push operation is erroneously stopped by the notice at the time of detection of the detector. This can further improve the usability of the remote control device.

A sixth aspect of the invention is a remote control device according to the fifth aspect, wherein the operation buttons have a detection position and a deactivation position. Each of the detectors detects the push operation when each of the operation buttons is located at the detection position. Each of the detectors deactivates the detection of the push operation when each of the operation buttons is located at the deactivation position. The deactivation position is nearer to the ordinary position than the detection position in each of the detectors.

This remote control device can maintain the detection state of each detector for a long time. This can suppress misdetection of the detection state.

A seventh aspect of the invention is a remote control device according to one of the first to sixth aspects, wherein the toilet device includes a nozzle for jetting water toward a human body private part, and the plurality of operation buttons include a jet button for causing jetting from the nozzle and a stop button for stopping jetting from the nozzle.

This remote control device can remotely control a toilet device having a sanitary washing function.

Embodiments of the invention will now be described with reference to the drawings. In the drawings, similar components are labeled with like reference numerals, and the detailed description thereof is omitted appropriately.

Figure 1B:
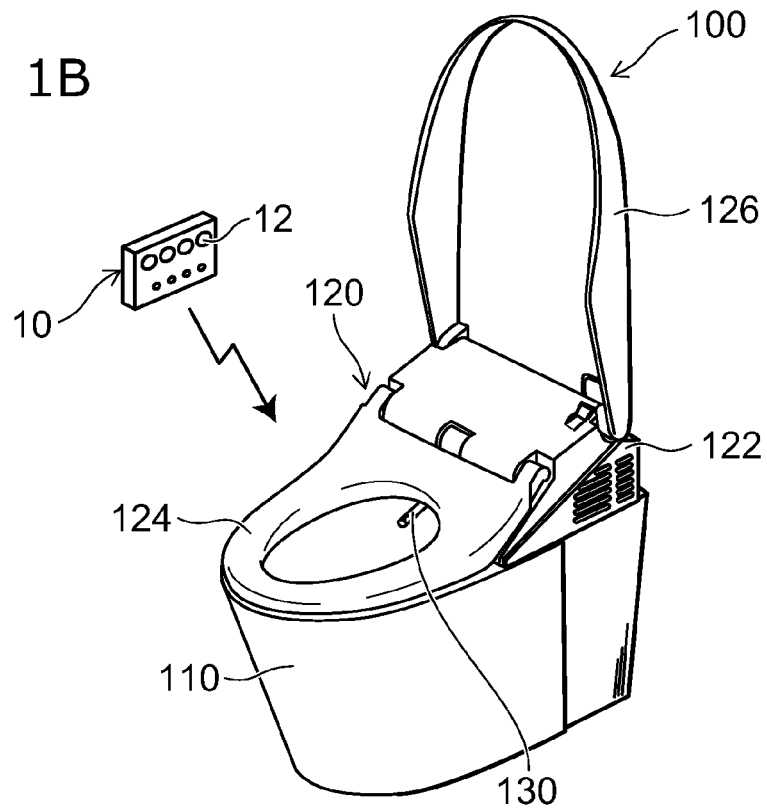

FIGS. 1A and 1B are perspective views schematically showing a remote control device according to an embodiment of the invention.

As shown in FIGS. 1A and 1B, the remote control device 10 is used with a toilet device 100. The remote control device 10 includes a plurality of operation buttons 12. Each operation button 12 is e.g. what is called a push button capable of push operation. Each operation button 12 is movable to an ordinary position and a lowermost position. Each operation button 12 moves from the ordinary position to the lowermost position in response to the push operation. Each operation button 12 is held at the ordinary position by a spring, not shown, when not operated. Each operation button 12 returns to the ordinary position by deactivation of the push operation after being moved to the lowermost position by the push operation.

The remote control device 10 detects the operation of each operation button 12. The remote control device 10 transmits a wireless signal depending on the operated operation button 12 to the toilet device 100. The toilet device 100 receives the wireless signal transmitted from the remote control device 10. The toilet device 100 performs an action depending on the wireless signal. Thus, the remote control device 10 instructs the toilet device 100 to perform a prescribed action depending on the user's operation. Accordingly, the remote control device 10 remotely controls the toilet device 100.

The toilet device 100 includes a sit-down toilet stool 110 (hereinafter referred to as toilet stool 110) and a toilet seat unit 120 provided thereon.

The toilet stool 110 includes a bowl section 112. The bowl section 112 is provided in the upper part of the toilet stool 110. The bowl section 112 is depressed from the upper surface 110a of the toilet stool 110. The bowl section 112 receives dirt, urine and the like excreted from the user. Furthermore, the bowl section 112 stores water inside. Thus, the bowl section 112 prevents a bad smell, pests and the like from intruding indoors from the drain pipe.

The toilet seat unit 120 includes a main section 122, a toilet seat 124, and a toilet lid 126. The toilet seat 124 and the toilet lid 126 are each pivotally supported on the main section 122 in an openable/closable manner. FIGS. 1A and 1B show the state of the toilet lid 126 being opened. FIG. 1A shows the state of the toilet seat 124 being opened. FIG. 1B shows the state of the toilet seat 124 being closed. The toilet lid 126 in the closed state covers the upside of the toilet seat 124. The toilet lid 126 does not necessarily need to be provided.

The toilet seat unit 120 has e.g. a sanitary washing function, a private part drying function, and a toilet seat warming function. The sanitary washing function is the function of performing a washing action for washing the "bottom" and the like of the user seated on the toilet seat 124. The private part drying function is the function of performing a drying action for drying the "bottom" and the like wetted by sanitary washing by blowing warm air to the "bottom" and the like of the user seated on the toilet seat 124. The toilet seat warming function is the function of performing a toilet seat heating action for warming the seating surface of the toilet seat 124 to a suitable temperature.

In the sanitary washing function, for instance, in response to the user's operation, the nozzle 130 for jetting water toward the human body private part is advanced from the main section 122 into the bowl section 112 of the toilet stool 110. Then, water is squirted from the jet port provided near the tip of the nozzle 130. Thus, the user's "bottom" and the like can be washed. The nozzle 130 is housed in the main section 122 when the sanitary washing function is not performed.

The sanitary washing function includes e.g. a bottom washing function for squirting water toward the user's "bottom", and a bidet washing function for squirting water toward the woman's private part. The sanitary washing function can squirt not only cold water, but also warm water heated by a heater, as wash water from the jet port.

The main section 122 is placed in the upper back of the toilet stool 110. The front surface of the main section 122 has a curved concave surface 132. The curved concave surface 132 is curved concavely along the shape of the opening end of the bowl section 112. An extending part 134 is provided on the left and right of the curved concave surface 132. The extending part 134 extends out forward along the opening end of the bowl section 112. The curved concave surface 132 has a shape elevated near the center and gradually lowered toward the left and right extending parts 134.

A nozzle damper 136 and a warm air damper 138 are provided at the center of the curved concave surface 132. The nozzle damper 136 is a closing member for covering the opening through which the nozzle 130 is advanced and retracted. The warm air damper 138 is juxtaposed on the right side of the nozzle damper 136. The warm air damper 138 is a closing member for covering the blowing port of warm air for drying the private part. For instance, the nozzle damper 136 and the warm air damper 138 are rotatably supported on the main section 122.

The nozzle damper 136 moves between the close position covering the opening and the open position exposing the opening by e.g. rotating about a support shaft. The nozzle damper 136 is held at the close position in the standby state in which the sanitary washing function is not performed. The nozzle damper 136 moves to the open position when the nozzle 130 is advanced by the execution of the sanitary washing function.

The warm air damper 138 moves between the close position covering the blowing port and the open position exposing the blowing port by e.g. rotating about a support shaft. The warm air damper 138 is held at the close position in the standby state in which the private part drying function is not performed. The warm air damper 138 moves to the open position when blowing warm air to the user's "bottom" and the like by the execution of the private part drying function.

Figure 2:
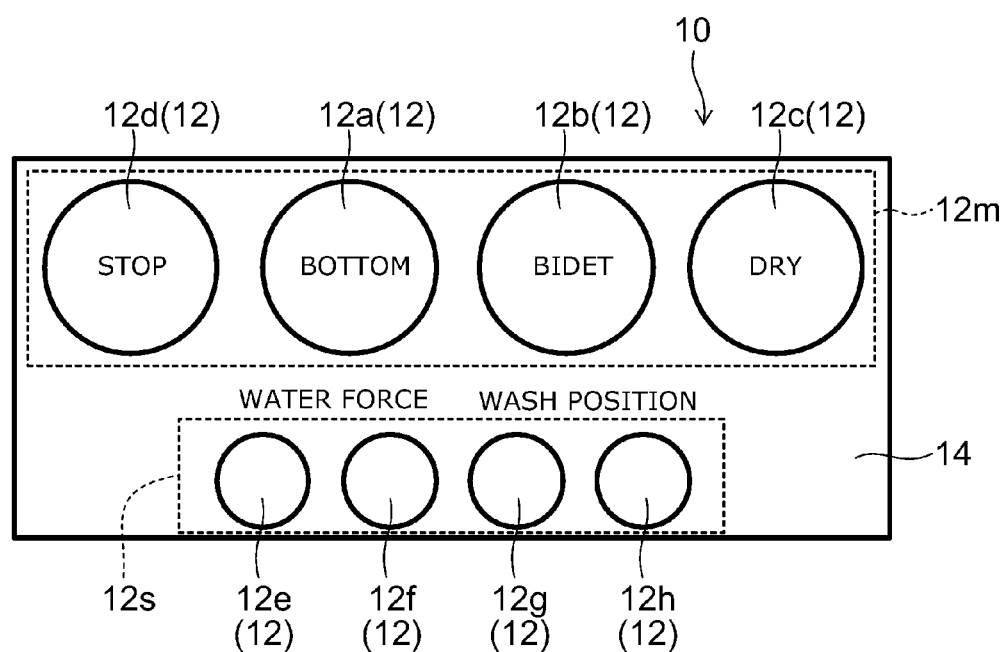
FIG. 2 is a front view schematically showing the remote control device according to the embodiment.

FIG. 2 is a front view schematically showing the remote control device according to the embodiment.

As shown in FIG. 2, the remote control device 10 includes a plurality of operation buttons 12 and a remote control body 14 supporting the operation buttons 12. The plurality of operation buttons 12 are separated into a main button group 12*m* and a sub button group 12*s*.

The main button group 12*m* includes e.g. a bottom wash button 12*a*, a bidet wash button 12*b*, a dry button 12*c*, and a stop button 12*d*.

The bottom wash button 12*a* is a button for instructing the toilet device 100 to start bottom washing. The bidet wash button 12*b* is a button for instructing the toilet device 100 to start bidet washing. The dry button 12*c* is a button for instructing the toilet device 100 to start private part drying. The stop button 12*d* is a button for instructing the toilet device 100 to stop the sanitary washing function or the private part drying function. That is, in this example, the bottom wash button 12*a* and the bidet wash button 12*b* are jet buttons for causing jetting from the nozzle 130. The stop button 12*d* stops jetting from the nozzle 130.

Thus, the main button group 12*m* includes operation buttons 12 for instructing the toilet device 100 to perform and stop various functions such as sanitary washing and private part drying.

The sub button group 12*s* includes e.g. a jet flow increase button 12*e*, a jet flow decrease button 12*f*, a wash position forward button 12*g*, and a wash position backward button 12*h*.

The jet flow increase button 12*e* is a button for inputting to the toilet device 100 an instruction for strengthening the force of water squirted during sanitary washing. The jet flow decrease button 12*f* is a button for inputting to the toilet device 100 an instruction for weakening the force of water squirted during sanitary washing. The wash position forward button 12*g* is a button for inputting to the toilet device 100 an instruction for advancing the wash position (the position of the nozzle 130). The wash position backward button 12*h* is a button for inputting to the toilet device 100 an instruction for retracting the wash position.

Thus, the sub button group 12*s* includes operation buttons 12 for instructing the toilet device 100 to change the state of various functions.

The operation buttons 12 included in the main button group 12*m* and the sub button group 12*s* are not limited to the foregoing. For instance, the sub button group 12*s* may include operation buttons 12 for instructing the toilet device 100 to change the temperature of water and drying air.

Figure 3:
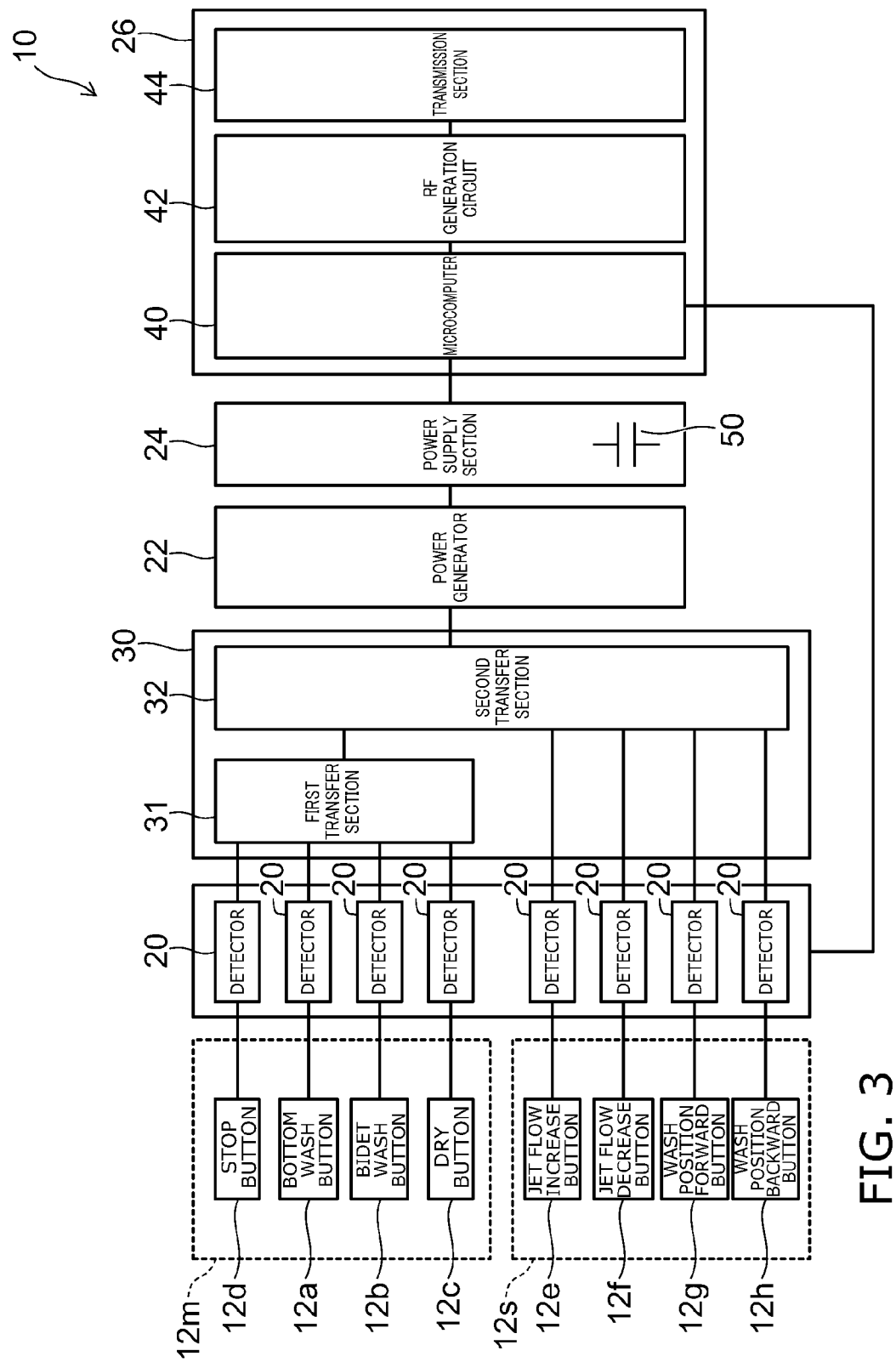
FIG. 3 is a block diagram schematically showing the remote control device according to the embodiment.

FIG. 3 is a block diagram schematically showing the remote control device according to the embodiment.

As shown in FIG. 3, the remote control device 10 further includes a plurality of detectors 20, a power generator 22, a power supply section 24, and a controller 26.

The plurality of detectors 20 are associated respectively with the plurality of operation buttons 12. The plurality of detectors 20 detect the respective push operation of the plurality of operation buttons 12. Each detector 20 is e.g. a Hall element. Each detector 20 may be e.g. a mechanical switch.

The power generator 22 generates power in response to the push operation of one of the plurality of operation buttons 12. The power generator 22 includes e.g. a motor. The power generator 22 transfers the operation force associated with the push operation of the operation button 12 to the rotary shaft of the motor and rotates the rotary shaft. Thus, the power generator 22 generates AC power from the motor. The power generation scheme of the power generator 22 is not limited to the motor, but may be an arbitrary scheme capable of supplying necessary power. The power outputted from the power generator 22 may be DC or pulsating.

A transfer mechanism 30 is provided between the power generator 22 and each operation button 12. The transfer mechanism 30 transfers the operation force associated with the push operation of each operation button 12 to the power generator 22. Thus, the operation force of the push operation of any of the operation buttons 12 is transferred to the power generator 22. Accordingly, the power generator 22 generates power. Thus, the remote control device 10 can generate power by one power generator 22 for a plurality of operation buttons 12.

The transfer mechanism 30 includes e.g. a first transfer section 31 and a second transfer section 32. The first transfer section 31 receives the operation force of the operation buttons 12 of the main button group 12*m* and transfers the operation force to the second transfer section 32. The second transfer section 32 receives the operation force from the first transfer section 31. Furthermore, the second transfer section 32 receives the operation force of the operation buttons 12 of the sub button group 12*s*. The second transfer section 32 transfers the operation force to the power generator 22.

The controller 26 operates using the power generated by the power generator 22. The controller 26 is electrically connected to each of the plurality of detectors 20. The controller 26 determines the pushed operation button 12 based on the detection result of each of the plurality of detectors 20. The controller 26 transmits a wireless signal corresponding to the determined operation button 12 toward the toilet device 100. Thus, the controller 26 remotely controls the toilet device 100.

For instance, when the controller 26 determines the push operation of the bottom wash button 12a, the controller 26 transmits a wireless signal indicating to start bottom washing to the toilet device 100. The toilet device 100 receives the wireless signal from the remote control device 10 and performs processing corresponding to the wireless signal. For instance, the toilet device 100 receives the wireless signal indicating to start bottom washing. In response thereto, the toilet device 100 advances the nozzle 130 into the bowl section 112 and starts jetting from the nozzle 130.

For instance, the controller 26 transmits the same wireless signal to the toilet device 100 a plurality of times. The controller 26 transmits the same wireless signal to the toilet device 100 e.g. three times. This can suppress e.g. communication errors between the remote control device 10 and the toilet device 100.

The controller 26 includes e.g. a microcomputer 40, a radio frequency generation circuit 42, and a transmission section 44. The microcomputer 40 performs e.g. determination of the pushed operation button 12 and generation of a signal corresponding to the determined operation button 12. For instance, the radio frequency generation circuit 42 converts the signal generated by the microcomputer 40 to a radio frequency signal. The radio frequency generation circuit 42 generates e.g. a 2.4-GHz radio frequency signal. The transmission section 44 includes e.g. an antenna. The transmission section 44 converts the radio frequency signal generated by the radio frequency generation circuit 42 to a wireless signal and transmits it to the toilet device 100.

The controller 26 transmits a 2.4-GHz wireless signal to the toilet device 100. In wireless communication using the 2.4-GHz band, there is no need to provide the remote control body 14 with a transmission window (what is called the black window) for radio waves as in the case of e.g. infrared communication. This can improve e.g. the designability of the remote control device 10. Furthermore, wireless communication using the 2.4-GHz band is less susceptible to obstacles than infrared communication. This can also improve the quality of communication with the toilet device 100.

The microcomputer 40, the radio frequency generation circuit 42, and the transmission section 44 may be housed in one chip, or separated as different elements. The communication between the remote control device 10 and the toilet device 100 is not limited to the foregoing, but may be arbitrary. The configuration of the controller 26 is not limited to the foregoing, but may be an arbitrary configuration enabling e.g. determination of the operation buttons 12 and wireless communication with the toilet device 100.

The power supply section 24 includes an electric storage element 50 for storing power generated by the power generator 22. When the voltage of the electric storage element 50 becomes more than or equal to a prescribed value, the power supply section 24 supplies the power stored in the electric storage element 50 to the controller 26 and activates the controller 26. The electric storage element 50 is e.g. a capacitor or storage battery.

Here, "when the voltage of the electric storage element 50 becomes more than or equal to a prescribed value" means e.g. when the power necessary for activating the controller 26 and transmitting a wireless signal is stored in the electric storage element 50. In the case where the controller 26 transmits a wireless signal a plurality of times, it means when the power necessary for activating the controller 26 and transmitting a wireless signal a plurality of times is stored in the electric storage element 50. Thus, the prescribed value of the voltage of the electric storage element 50 is set depending on the power consumption in the controller 26. The prescribed value is e.g. 3.5 V. In other words, "when the voltage of the electric storage element 50 becomes more than or equal to a prescribed value" means when the integral amount of power of the power generator 22 becomes more than or equal to the prescribed value.

The capacity of the electric storage element 50 is set to e.g. the minimum capacity capable of storing the power necessary for activating the controller 26 and transmitting a wireless signal. This can suppress e.g. upsizing of the electric storage element 50. Furthermore, this can suppress e.g. malfunctions of the controller 26 due to excess power remaining in the electric storage element 50.

Figure 4:
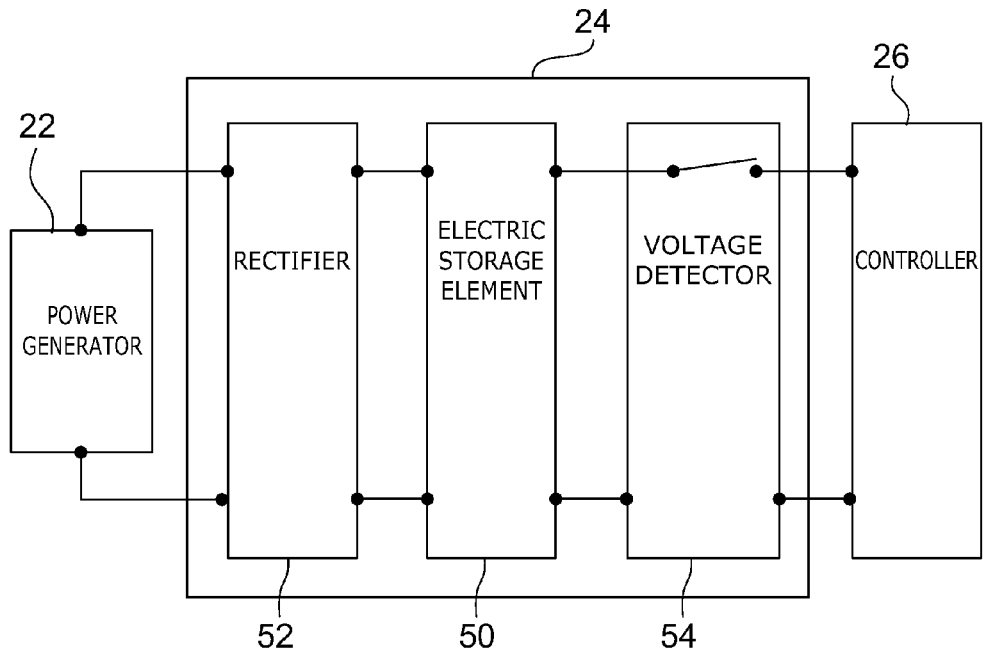
FIG. 4 is a circuit diagram schematically showing the power supply section according to the embodiment.

FIG. 4 is a circuit diagram schematically showing the power supply section according to the embodiment.

As shown in FIG. 4, the power supply section 24 further includes e.g. a rectifier 52 and a voltage detector 54. The rectifier 52 is electrically connected to the output of the power generator 22. The rectifier 52 rectifies the AC power outputted from the power generator 22 and converts it to pulsating power. The rectifier 52 is e.g. a diode bridge including four diodes 52d.

The electric storage element 50 is electrically connected to the output of the rectifier 52 and stores the pulsating power outputted from the rectifier 52. Thus, the electric storage element 50 converts the pulsating power of the rectifier 52 to DC power.

The voltage detector 54 detects the voltage of the electric storage element 50. The voltage detector 54 passes a current to the controller 26 when the voltage of the electric storage element 50 becomes more than or equal to the prescribed value. Thus, the power stored in the electric storage element 50 is supplied to the controller 26. The controller 26 is supplied with the DC voltage detected by the voltage detector 54, which is more than or equal to the prescribed value.

Figure 5:
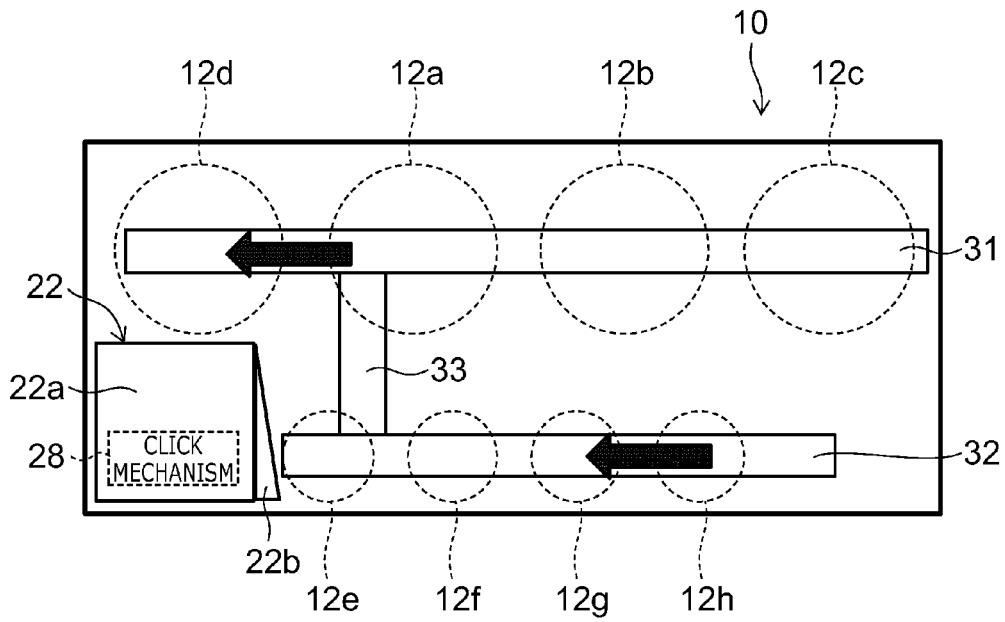
FIG. 5 is a schematic view showing the internal structure of the remote control device according to the embodiment.

FIG. 5 is a schematic view showing the internal structure of the remote control device according to the embodiment.

As shown in FIG. 5, the power generator 22 includes a main module 22a and a movable part 22b. The movable part 22b moves to a projected position projected from the main module 22a and a pushed position pushed into the main module 22a. The movable part 22b is held at the projected position by e.g. a spring, not shown, when not operated. The movable part 22b is moved from the projected position to the pushed position. The power generator 22 generates power by the operation force associated with this movement of the movable part 22b.

The first transfer section 31 is shaped like a bar opposed to each operation button 12 of the main button group 12m. The second transfer section 32 is shaped like a bar opposed to each operation button 12 of the sub button group 12s. The second transfer section 32 is placed at the position opposed to the movable part 22b of the power generator 22 in the longitudinal direction.

The first transfer section 31 and the second transfer section 32 are attached slidably in the longitudinal direction as indicated by arrows in the figure. That is, the first transfer section 31 and the second transfer section 32 are what is called slide bars. The first transfer section 31 and the second transfer section 32 are connected to each other by a link member 33. Thus, the first transfer section 31 and the second transfer section 32 are slid in an interlocked manner.

When one of the operation buttons 12 of the main button group 12m is pushed, the operation force is transferred to the first transfer section 31. Thus, the first transfer section 31 is slid. When the first transfer section 31 is slid, the second transfer section 32 is slid through the link member 33. Thus, the second transfer section 32 abuts on the movable part 22b. Accordingly, the second transfer section 32 moves the movable part 22b from the projected position to the pushed position.

When one of the operation buttons 12 of the sub button group 12s is pushed, the operation force is transferred to the second transfer section 32. Thus, the second transfer section 32 is slid. The slid second transfer section 32 abuts on the movable part 22b. Thus, the second transfer section 32 moves the movable part 22b from the projected position to the pushed position. Accordingly, the power generator 22 generates power by the push operation of each operation button 12.

The remote control device 10 further includes a click mechanism 28. The click mechanism 28 outputs a click feeling to the pushed operation button 12. Furthermore, the click mechanism 28 outputs a sound when one of the operation buttons 12 is pushed.

In this example, the click mechanism 28 is provided in the power generator 22. In the power generator 22, for instance, when the movable part 22b is pushed against the elastic force of e.g. a spring, an interlock member engaged with the movable part 22b moves. Then, when the movable part 22b moves to the pushed position, the click mechanism 28 temporarily disengages the engagement state between the interlock member and the movable part 22b. Thus, the interlock member returns to the initial position by the elastic force. At this time, the operation force of the operation button 12 is weakened and conveyed to the user as a click feeling.

When the interlock member returns to the initial position, the interlock member stops by collision with another member. A sound is outputted by this collision of the interlock member. Thus, the click mechanism 28 mechanically outputs a sound in response to the push operation of the operation button 12. For instance, the click mechanism 28 outputs a click sound associated with the collision of the interlock member.

The interlock member is linked to the rotary shaft of the motor through a gear and the like. The rotary shaft is rotated by the momentum of the interlock member returning to the initial position and generates power. The power generator 22 generates power by the movement of the movable part 22b to the pushed position when the operation button 12 is pushed. That is, when the power generator 22 generates power, the click mechanism 28 outputs a click feeling to the pushed operation button 12 and outputs a sound. Thus, the click mechanism 28 is an output unit for performing output when the power generator 22 generates power. In other words, the output unit is a notice section for sending a notice when the power generator 22 generates power.

In this configuration of the power generator 22, for instance, the amount of power generation can be controlled by the elastic force applied to the interlock member independent of e.g. the speed of the push operation of the user. This can suppress e.g. variation in the amount of power generation between the operations. A stable amount of power generation can be obtained in the power generator 22.

In this example, the click mechanism 28 doubles as part of the power generation mechanism of the power generator 22. The click mechanism 28 does not necessarily need to be provided in the power generator 22, but may be provided separately from the power generator 22.

Figure 6:
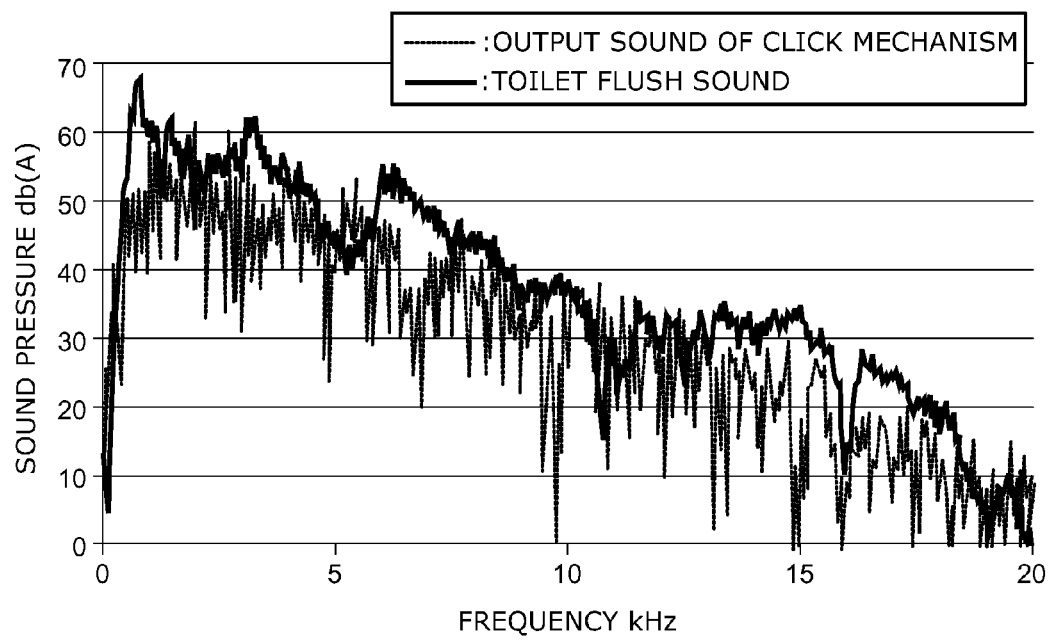
FIG. 6 is a graph schematically showing an example characteristic of the remote control device according to the embodiment.

FIG. 6 is a graph schematically showing an example characteristic of the remote control device according to the embodiment.

FIG. 6 shows an example of the frequency spectrum of the sound outputted by the click mechanism 28 at the time of power generation (hereinafter referred to as click sound). Furthermore, FIG. 6 shows an example of the frequency spectrum of the sound at the time of toilet flushing of the toilet device 100 (hereinafter referred to as toilet flush sound). The horizontal axis of FIG. 6 represents frequency (kHz). The vertical axis of FIG. 6 represents sound pressure (dB(A)). In FIG. 6, each frequency spectrum is processed by the A-weighting filter. The A-weighting filter is a filter for correcting the sound pressure level by simulating the sensitivity of the human auditory sense. The A-weighting filter attenuates low-frequency and high-frequency components without affecting components around e.g. 1000 Hz.

As shown in FIG. 6, the click sound includes frequency components (the portion encircled with the dashed line in the figure) having higher sound pressure than the toilet flush sound. The portion of the click sound having higher sound pressure than the toilet flush sound indicates that the click sound can be perceived by a human as a sound different from the toilet flush sound even when the click sound is produced simultaneously with the toilet flush sound.

Similarly, the click sound includes frequency components having higher sound pressure than the jet sound of the nozzle 130 (hereinafter referred to as nozzle jet sound). Thus, a human can perceive the click sound as a sound different from the nozzle jet sound even when the click sound is produced simultaneously with the nozzle jet sound. Accordingly, the click mechanism 28 outputs a click sound including frequency components having higher sound pressure than the toilet flush sound and the nozzle jet sound.

FIGS. 7A to 7D are schematic views showing part of the remote control device according to the embodiment.

FIGS. 7A to 7D schematically show an example of the push operation of the operation button 12.

Figure 7:
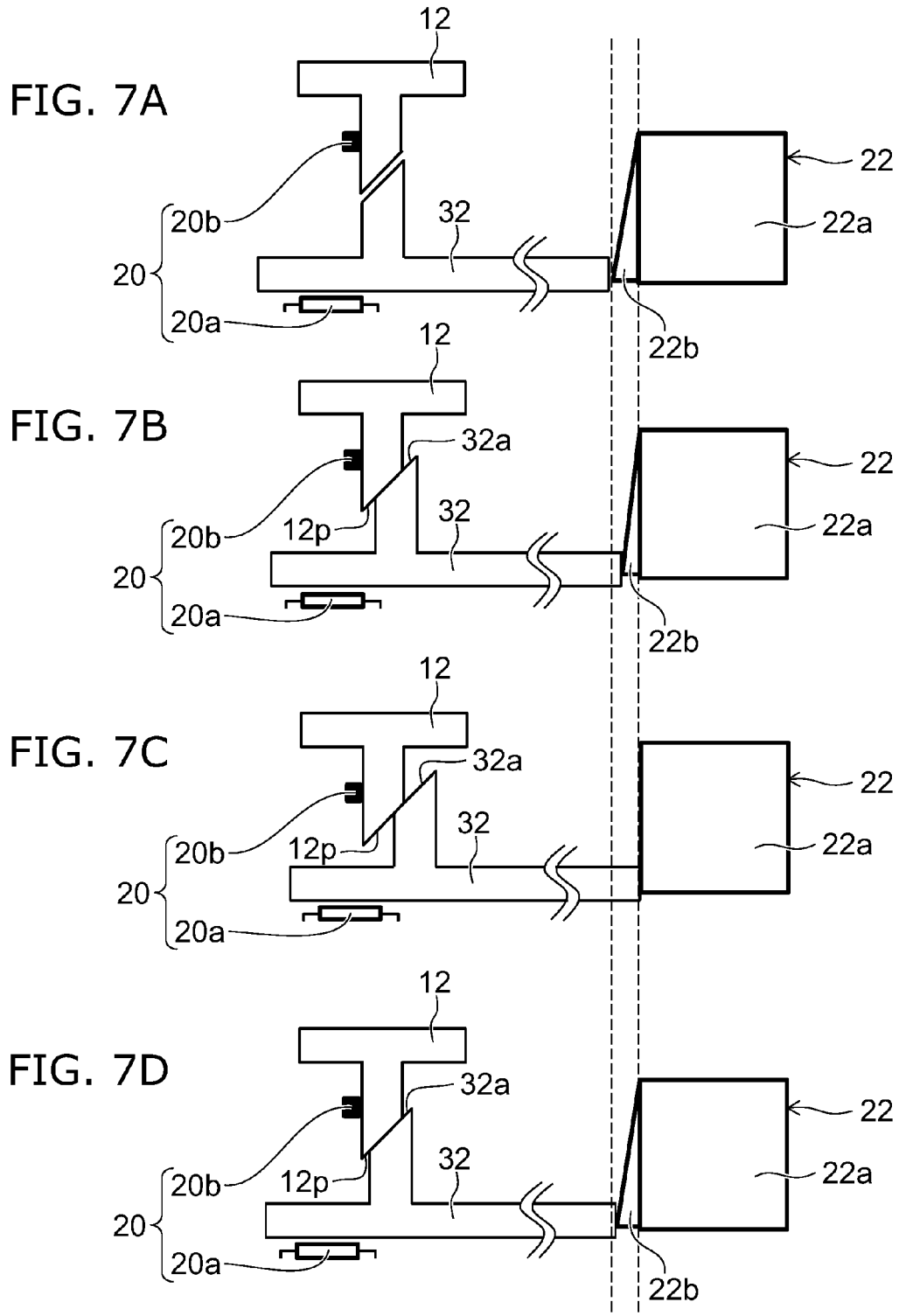
FIGS. 7A to 7D are schematic views showing part of the remote control device according to the embodiment.

FIG. 7A shows the state of the operation button 12 at the ordinary position.

FIG. 7B shows the position of the operation button 12 at which the detector 20 detects the push operation.

FIG. 7C shows the state of the operation button 12 at the lowermost position.

FIG. 7D shows the position of the operation button 12 at which the detector 20 deactivates the detection state of the push operation.

As shown in FIGS. 7A to 7D, the detector 20 includes e.g. a Hall element 20a and a magnet 20b. The Hall element 20a is held at e.g. a prescribed position in the remote control body 14. The magnet 20b is attached to the operation button 12. The detector 20 detects the push operation of the operation button 12 by the decrease of the distance between the Hall element 20a and the magnet 20b in response to the push operation of the operation button 12. Thus, the detector 20 detects the push operation of the operation button 12 e.g. in a non-contact manner. With regard to the position of the Hall element 20a and the magnet 20b, contrary to the foregoing, the Hall element 20a may be provided on the operation button 12, and the magnet 20b may be provided in the remote control body 14. The method for detecting the push operation is not limited to the foregoing, but may be an arbitrary method.

The second transfer section 32 includes a slide cam 32a shaped like a slope surface. The operation button 12 includes a slope surface 12p corresponding to the slide cam 32a at the position opposed to the slide cam 32a. Thus, when the operation button 12 is pushed, the vertical force is converted to a horizontal force in accordance with the slope of the slide cam 32a. Thus, the second transfer section 32 is slid. Although not shown, the first transfer section 31 is also slid by a slide cam like the second transfer section 32.

As shown in FIG. 7B, the operation button 12 is pushed to decrease the distance between the Hall element 20a and the magnet 20b. Thus, the push operation of the operation button 12 is detected by the detector 20.

As shown in FIG. 7C, the operation button 12 is further pushed and moved to the lowermost position. Thus, the movable part 22b of the power generator 22 is moved to the pushed position. Accordingly, power generation is performed by the power generator 22.

Thus, the plurality of detectors 20 detect the push operation of the corresponding respective operation buttons 12 before power generation of the power generator 22. That is, the plurality of detectors 20 detect the push operation before activation of the controller 26.

Furthermore, the power generator 22 makes the voltage of the electric storage element 50 more than or equal to the prescribed value when the operation button 12 is moved to the power generation position on the lowermost position side of the detection position of the detector 20 (the position shown in FIG. 7B). Thus, the power generator 22 enables transmission of a wireless signal from the controller 26 only by the push operation.

In this example, the lowermost position is the power generation position. The power generation position is not limited thereto, but may be an arbitrary position between the detection position and the lowermost position. That is, the power generation position is a position between the detection position and the lowermost position, or the lowermost position. In this example, power generation is performed by the power generator 22 when the movable part 22b is moved to the pushed position. The position of the movable part 22b at which power generation is performed is not limited to the pushed position, but may be an arbitrary position between the projected position and the pushed position.

When the push operation of the operation button 12 is deactivated, the movable part 22b of the power generator 22 returns to the projected position by the elastic force. When the movable part 22b returns to the projected position, the elastic force is transferred to the operation button 12 through the transfer mechanism 30. Thus, the operation button 12 returns to the ordinary position. The operation button 12 may be restored to the ordinary position by only the elastic force from an elastic body (such as a spring and rubber) provided in the power generator 22. Alternatively, the operation button 12 may be restored to the ordinary position by another elastic body further provided on the transfer mechanism 30 or the operation button 12.

As shown in FIG. 7D, the plurality of detectors 20 deactivate the detection state of the push operation by the time when the operation button 12 returns from the power generation position to the ordinary position in response to the deactivation of the push operation. At this time, the detector 20 deactivates detection when the distance to the magnet 20b is larger than that at the time of detection due to hysteresis of the Hall element 20a. Thus, in each of the plurality of detectors 20, the position of the operation button 12 at which the detection state is deactivated is nearer to the ordinary position than the detection position.

Figure 8:
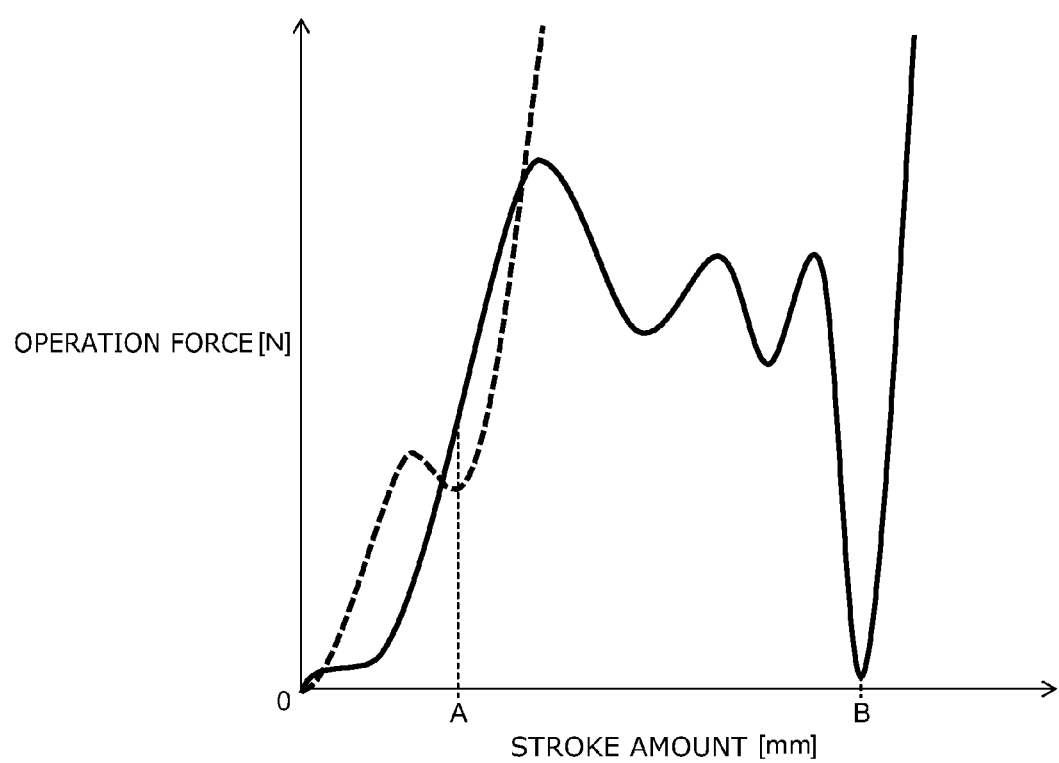
FIG. 8 is a graph schematically showing an example characteristic of the remote control device according to the embodiment.

FIG. 8 is a graph schematically showing an example characteristic of the remote control device according to the embodiment.

FIG. 8 shows an example of the relationship between the stroke amount (mm) and the operation force (N) of the operation button 12. The stroke amount is, in other words, the push amount. The position of the stroke amount being zero is the ordinary position. In FIG. 8, the solid line represents an example of the operation force of the operation button 12 according to this embodiment. The dashed line represents an example of the operation force of a reference example. In the reference example, the push operation is detected by e.g. a mechanical switch at the lowermost position. The operation button of the reference example is e.g. an operation button used in conventional remote control devices such as wired and battery-powered remote control devices.

In the operation button of the reference example, position A is the lowermost position. Detection is performed at the position A. Furthermore, the operation button is given a click feeling by e.g. a switch at the position A. That is, in the conventional remote control device, the operation button is given a click feeling at the time of detecting the push operation.

On the other hand, in the operation button 12 of this example, position A is the detection position, and position B is the lowermost position (power generation position). In the remote control device 10, when the operation button 12 moves to the power generation position, the click mechanism 28 outputs a click feeling to the pushed operation button 12. The click mechanism 28 outputs a click feeling to the operation button 12 at the time of power generation of the power generator 22.

As described above, the detector 20 detects the push operation in a non-contact manner. Thus, in this example, the change of the operation force imparted to the operation button 12 when the detector 20 detects the push operation is smaller than the change of the operation force imparted to the operation button 12 by the click mechanism 28. In this example, the detector 20 imparts substantially no change of operation force to the operation button 12 at the time of detecting the push operation.

Furthermore, detection performed in a non-contact manner causes no sound or the like at the time of detection of the detector 20. Thus, each detector 20 sends substantially no notice at the time of detecting the push operation. Here, "sends no notice" includes the case where e.g. a mechanical switch causes a vibration or sound imperceptible to a human.

Next, the function of the remote control device 10 according to this embodiment is described.

FIGS. 9A to 9E are graphs schematically showing an example action of the remote control device according to the embodiment.

Figure 9A:
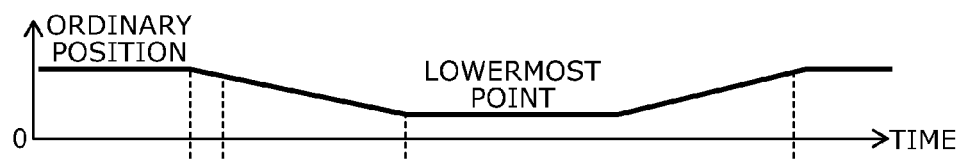
FIGS. 9A to 9E are graphs schematically showing an example action of the remote control device according to the embodiment.
Figure 9B:
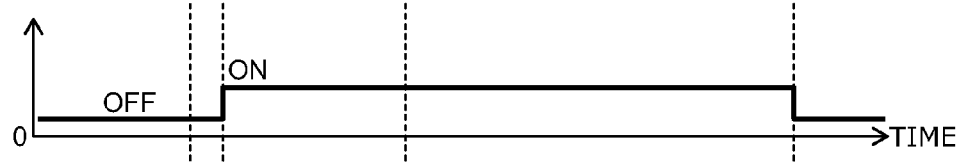
Figure 9C:
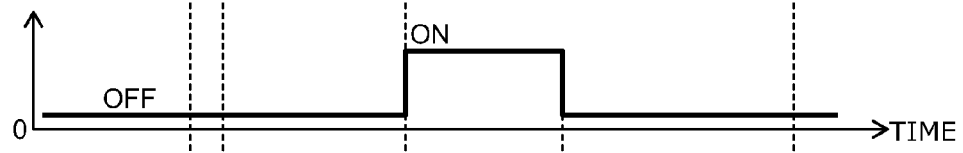
Figure 9D:
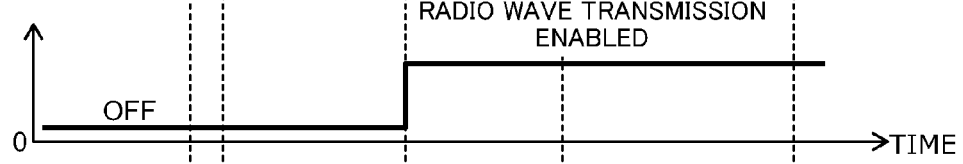
Figure 9E:
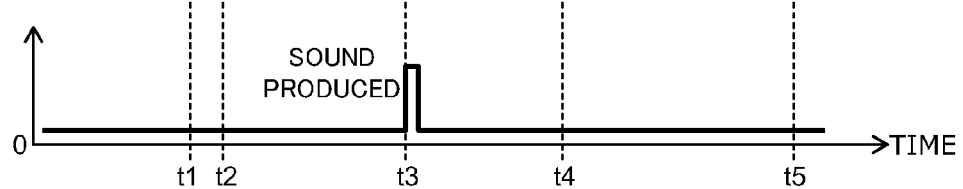
Figure 10A:
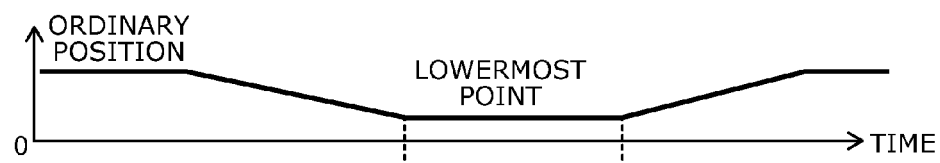
FIGS. 10A to 10E are graphs schematically showing an alternative example action of the remote control device according to the embodiment.
Figure 10B:
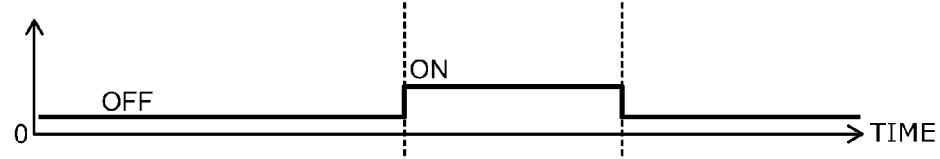
Figure 10C:
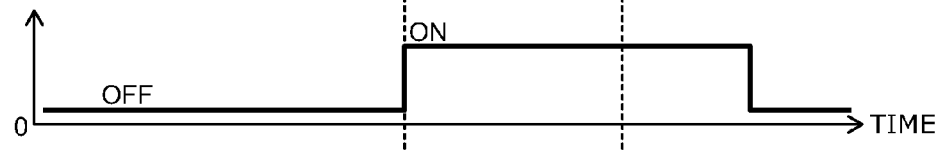
Figure 10D:
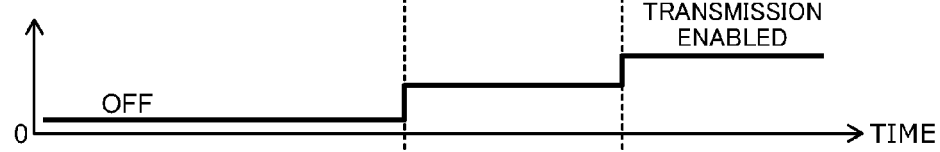
Figure 10E:
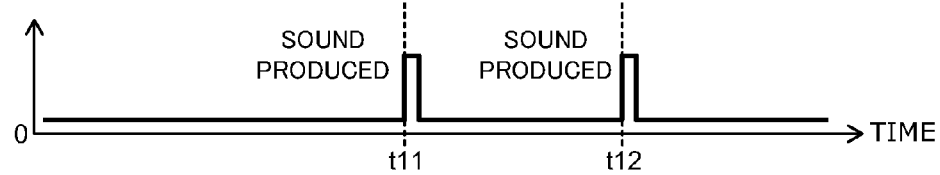

The horizontal axis of FIGS. 9A to 9E represents time (seconds). The vertical axis of FIG. 9A represents the position (mm) of the operation button 12. The vertical axis of FIG. 9B represents the detection state of the detector 20. In FIG. 9B, the state in which the detector 20 detects the push operation (hereinafter referred to as on-state) is indicated as "Hi". The state in which the detector 20 does not detect the push operation (hereinafter referred to as off-state) is indicated as "Lo". The vertical axis of FIG. 9C represents activation and stop of the controller 26. The vertical axis of FIG. 9D represents the voltage of the electric storage element 50. The vertical axis of FIG. 9E represents the sound pressure level of the click mechanism 28.

The user pushes an operation button 12 of the remote control device 10 as needed after e.g. using the toilet device 100 (time t1 of FIGS. 9A to 9E). When the user pushes one of the operation buttons 12, the push operation is detected by the corresponding detector 20 (time t2 of FIGS. 9A to 9E).

At time t2, power generation has not been performed yet by the power generator 22, and the controller 26 has not been activated. Thus, the detector 20 detects the push operation before activation of the controller 26. Accordingly, when the controller 26 is activated, the push operation has already been detected. Thus, for instance, the controller 26 can appropriately determine the operation button 12.

The operation button 12 is further pushed and moved to the lowermost position (power generation position) (time t3 of FIGS. 9A to 9E). When the operation button 12 is moved to the lowermost position, the operation force is transferred to the movable part 22b of the power generator 22 through the transfer mechanism 30. Thus, the movable part 22b moves to the pushed position. When the movable part 22b moves to the pushed position, power generation is performed by the power generator 22.

Furthermore, when the operation button 12 is moved to the lowermost position, the click mechanism 28 outputs a click feeling to the pushed operation button 12. Furthermore, the click mechanism 28 outputs a click sound. This can cause the user to recognize that the power generator 22 has generated power. The user can be notified that the power generator 22 has generated power. In other words, this can cause the user to recognize that the operation button 12 has been appropriately operated. Thus, the operation button 12 can be reliably operated by the user. This can cause the user to perform power generation and activation of the controller 26 appropriately.

The click mechanism 28 outputs a click sound including frequency components having higher sound pressure than the toilet flush sound and the nozzle jet sound. This can cause the user to recognize the click sound appropriately even at the time of toilet flushing and nozzle jetting. For instance, the user can be appropriately notified that the power generator 22 has generated power even at the time of toilet flushing and nozzle jetting.

When the power generator 22 generates power, the voltage of the electric storage element 50 becomes more than or equal to the prescribed value. Thus, the power stored in the electric storage element 50 is supplied from the power supply section 24 to the controller 26.

The controller 26 is activated in response to power supply from the power supply section 24. After activation, the controller 26 first determines the pushed operation button 12 based on the detection result of each detector 20. Then, the controller 26 transmits a wireless signal corresponding to the determined operation button 12 to the toilet device 100. For instance, the controller 26 transmits a wireless signal a plurality of times. The toilet device 100 receives the wireless signal from the controller 26 and performs an action corresponding to the received wireless signal. Thus, the controller 26 remotely controls the toilet device 100.

In the remote control device 10, the controller 26 is not activated until the voltage of the electric storage element 50 becomes more than or equal to the prescribed value. For instance, there is no need that the controller 26 monitors the charge amount of the electric storage element 50. This can suppress the power consumption. The remote control device 10 can be driven with the minimum amount of power generation without wastefully consuming power generated by the power generator 22. Furthermore, the power generator 22 and the electric storage element 50 can be downsized by suppressing the amount of power generation of the power generator 22 and the capacity of the electric storage element 50. Thus, the remote control device 10 can be downsized.

For instance, in conventional remote control devices such as wired and battery-powered remote control devices, a signal is transmitted to the toilet device when the push operation of the operation button is detected. On the other hand, in the remote control device 10 according to this embodiment, a wireless signal is transmitted to the toilet device 100 when power generation is performed by the power generator 22.

In the remote control device 10, when the operation button 12 is moved to the power generation position on the lowermost position side of the detection position of the detector 20, the voltage of the electric storage element 50 becomes more than or equal to the prescribed value. Thus, a wireless signal can be transmitted from the controller 26 by only the push operation. Accordingly, a wireless signal can be transmitted with an operation feeling similar to that of conventional remote control devices. This can suppress e.g. giving the user a feeling of unnaturalness due to the difference in operation feeling.

Furthermore, the plurality of detectors 20 send substantially no notice at the time of detecting the push operation. This can suppress that the push operation is erroneously stopped in response to the notice outputted from the detector 20. Thus, the usability of the remote control device 10 can be further improved.

The controller 26 turns to the stop state after transmitting the wireless signal (time t4 of FIGS. 9A to 9E). For instance, after transmitting the wireless signal, the controller 26 may be turned to the stop state by the voltage of the electric storage element 50 becoming less than the prescribed value.

For instance, the user deactivates the push operation of the operation button 12 by disengaging the finger from the operation button 12. Then, the operation button 12 moves toward the ordinary position. When the distance between the Hall element 20a and the magnet 20b reaches a prescribed distance, the detection state of the push operation detected by the detector 20 is deactivated (time t5 of FIGS. 9A to 9E). Thus, the plurality of detectors 20 deactivate the detection state of the push operation by the time when the operation button 12 returns from the power generation position to the ordinary position in response to the deactivation of the push operation.

For instance, if detection is performed when the operation button 12 moves to the lowermost position, the operation button 12 needs to be held down until the controller 26 is activated and determines the detection of the detector 20. In contrast, in the remote control device 10, even if the operation button 12 leaves the lowermost position, the detection state of the push operation is not immediately deactivated. Thus, a temporal leeway is given until deactivation of the detection state. This can suppress holding down of the operation button 12. For instance, it is possible to provide usability similar to that of conventional remote control devices such as wired and battery-powered remote control devices.

For instance, after the operation button 12 is moved to the power generation position, the push operation may be immediately deactivated. Even in this case, it is desired that the controller 26 can appropriately determine the operated operation button 12. This is achieved by adjusting the position of the Hall element 20a and the magnet 20b, the returning speed of the operation button 12 (such as the elastic force of the elastic body), and the operation speed of the controller 26. That is, they are adjusted so that immediate deactivation of the push operation does not deactivate the detection state of the detector 20 before the controller 26 determines the push operation. This can appropriately suppress malfunctions of the remote control device 10.

In the remote control device 10, in each of the plurality of detectors 20, the position of the operation button 12 at which the detection state is deactivated is nearer to the ordinary position than the detection position. Thus, for instance, a long time can be ensured for the detection state of each detector 20. This can suppress misdetection of the detection result more appropriately.

In the above embodiment, the position of the operation button 12 at which the detection state is deactivated is made nearer to the ordinary position than the detection position by hysteresis of the Hall element 20a. The embodiment is not limited thereto. For instance, two mechanical switches may be juxtaposed as the detector 20 in the moving direction of the operation button 12. For instance, when the two switches are both turned on, the push operation is detected. When the two switches are both turned off, detection of the push operation is deactivated. Thus, also in the case of using two switches, the position of the operation button 12 at which the detection state is deactivated can be made nearer to the ordinary position than the detection position.

FIGS. 10A to 10E are graphs schematically showing an alternative example action of the remote control device according to the embodiment.

The relationship between the horizontal axis and the vertical axis of FIGS. 10A to 10E is the same as that of FIGS. 9A to 9E. Thus, the description thereof is omitted.

As shown in FIGS. 10A to 10E, in this example, the power generator 22 generates power in two steps when the operation button 12 moves from the ordinary position to the lowermost position and when the operation button 12 moves from the lowermost position to the ordinary position.

In this example, when the operation button 12 is pushed and moved from the ordinary position to the lowermost position, the power generator 22 generates power, and the controller 26 is activated (time t11 of FIGS. 10A to 10E). In this example, when the operation button 12 is located at the lowermost position, the push operation is detected by the detector 20. After activation, the controller 26 determines the pushed operation button 12. Furthermore, when the operation button 12 is moved to the lowermost position, the click mechanism 28 outputs a click feeling to the pushed operation button 12. Furthermore, the click mechanism 28 outputs a click sound.

Then, the push operation of the operation button 12 is deactivated. Thus, the operation button 12 is moved from the lowermost position to the ordinary position (time t12 of FIGS. 10A to 10E). Accordingly, the power generator 22 further generates power. This enables transmission of a wireless signal to the toilet device 100. For instance, the controller 26 transmits a wireless signal to the toilet device 100 after detection of the push operation is deactivated. Furthermore, when the operation button 12 is moved from the lowermost position, the click mechanism 28 outputs again a click feeling and a click sound.

Thus, power generation may be performed by the power generator 22 at both times when the operation button 12 moves from the ordinary position to the lowermost position and when the operation button 12 moves from the lowermost position to the ordinary position. Also in this case, the controller 26 is activated when the voltage of the electric storage element 50 becomes more than or equal to the prescribed value. This can suppress wasteful consumption of power. For instance, the remote control device 10 can be downsized.

In this case, the click mechanism 28 outputs a click feeling and a click sound at both the two steps of power generation. This can notify the user of the two steps of power generation. Also in the case of two-step power generation, the user can be notified that the operation button 12 has been appropriately operated. Also in the case of two-step power generation, it is possible to cause the user to operate the operation button 12 appropriately. Here, at the second time of power generation, for instance, it is only necessary to disengage the finger. Thus, at this time, output of a click feeling and a click sound is not necessarily needed. However, a click feeling and a click sound may be outputted also at the second time of power generation. This can notify the user of e.g. completion of the operation, i.e., the state in which a wireless signal is transmitted. For instance, the usability of the remote control device 10 can be further improved.

In this example, no wireless signal is transmitted by only performing the push operation. A wireless signal is transmitted when the push operation is deactivated. Thus, the operation feeling may be different from that of conventional remote control devices. This may give the user a feeling of unnaturalness. Thus, as described with reference to e.g. FIGS. 9A to 9E, it is desirable to enable transmission of a wireless signal by only the push operation.

Figure 11A:
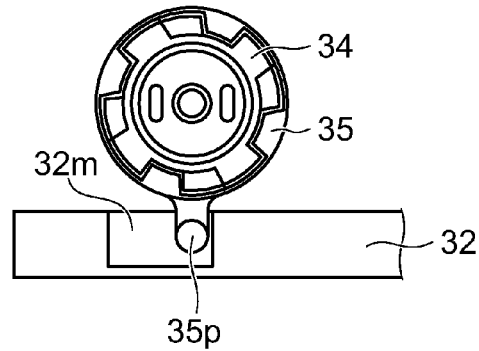
FIGS. 11A to 11C are schematic views showing an alternative transfer mechanism of the remote control device according to the embodiment.
Figure 11B:
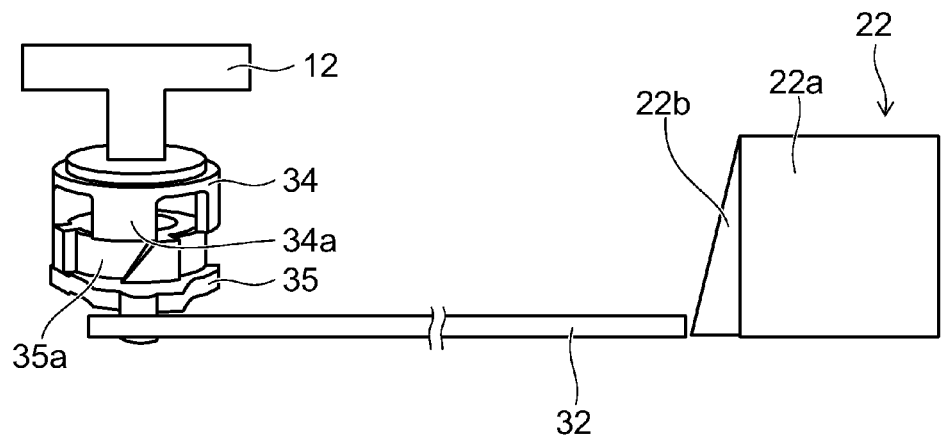
Figure 11C:
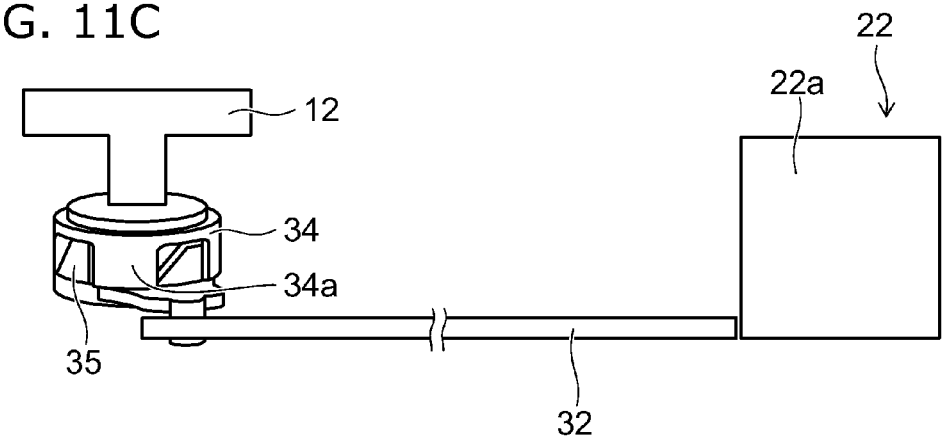

FIGS. 11A to 11C are schematic views showing an alternative transfer mechanism of the remote control device according to the embodiment.

In FIGS. 11A to 11C, the transfer mechanism 30 further includes a transfer cam 34 and a rotary cam 35. The transmission cam 34 and the rotary cam 35 are provided in a plurality corresponding respectively to the plurality of operation buttons 12.

The transfer cam 34 is provided at a position opposed to the operation button 12. The transfer cam 34 is attached so as to be movable in the moving direction of the operation button 12. The transfer cam 34 is moved with the operation button 12. For instance, the transfer cam 34 may be attached to the operation button 12.

The rotary cam 35 is provided at a position opposed to the transfer cam 34. The rotary cam 35 is attached so as to be rotatable about the moving direction of the operation button 12. The rotary cam 35 includes a cam groove 35a. The cam groove 35a includes a slope surface sloped with respect to the axial direction. Furthermore, the rotary cam 35 includes a protrusion 35p. The protrusion 35p is engaged with a groove 32m provided in the second transfer section 32.

The transfer cam 34 includes a projected part 34a. The projected part 34a is placed at a position opposed to the slope surface of the cam groove 35a. When the operation button 12 is pushed, the projected part 34a of the transfer cam 34 enters the cam groove 35a and abuts on the slope surface of the cam groove 35a. Thus, the rotary cam 35 rotates in accordance with the slope surface of the cam groove 35a. When the rotary cam 35 rotates, the second transfer section 32 is slid by engagement between the protrusion 35p and the groove 32m. Thus, as in the above embodiment, the movable part 22b of the power generator 22 is moved from the projected position to the pushed position by the push operation of the operation button 12. Accordingly, power generation is performed by the power generator 22.

Thus, the transfer mechanism 30 may have a configuration including a plurality of transfer cams 34 and a plurality of rotary cams 35. The configuration of the transfer mechanism 30 may be an arbitrary configuration capable of transferring the operation force associated with the push operation of each operation button 12 to the power generator 22.

Figure 12:
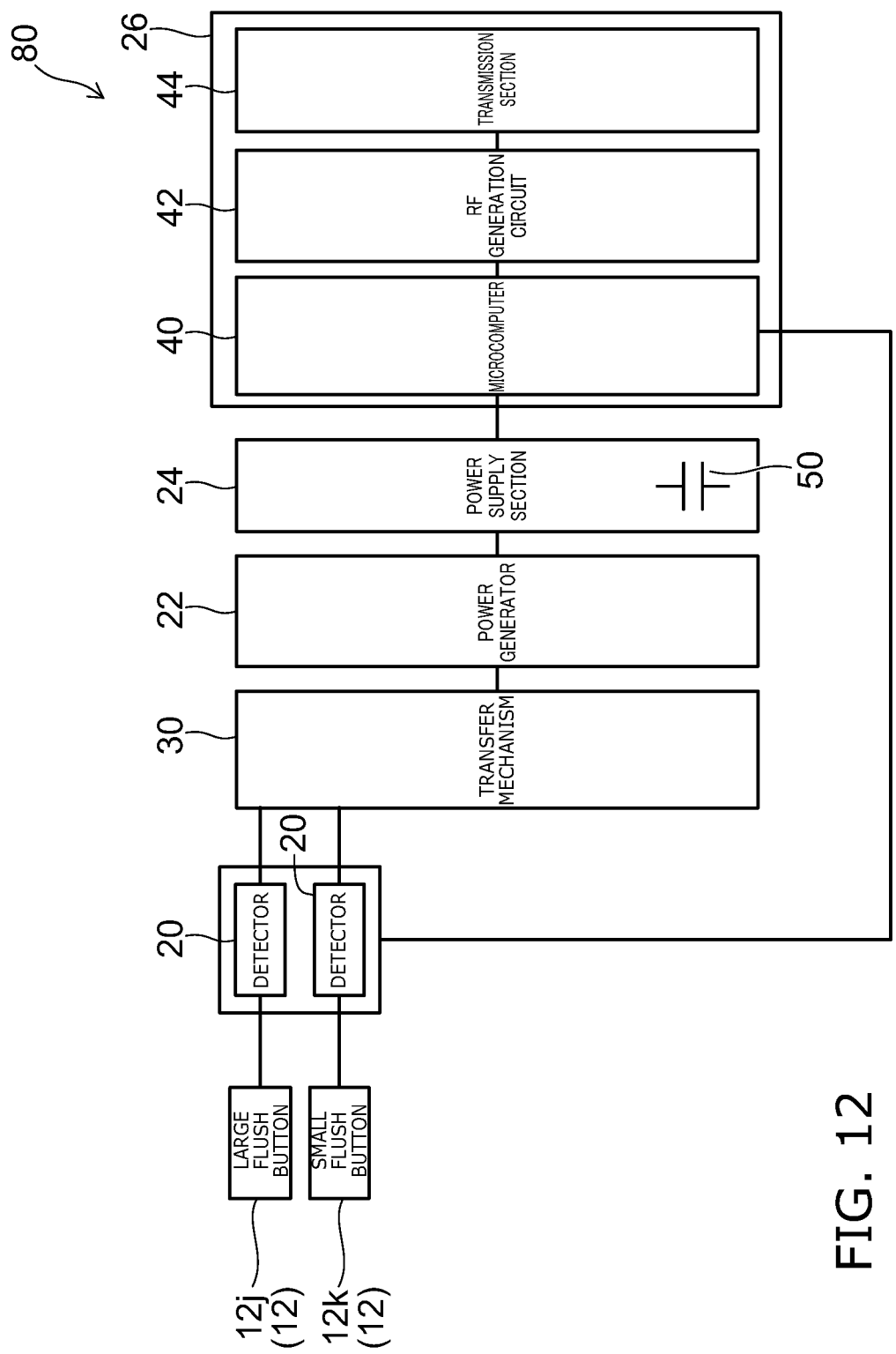
FIG. 12 is a block diagram schematically showing an alternative remote control device according to the embodiment.

FIG. 12 is a block diagram schematically showing an alternative remote control device according to the embodiment.

As shown in FIG. 12, the remote control device 80 includes a large flush button 12j and a small flush button 12k as a plurality of operation buttons 12. The large flush button 12j is a button for instructing the toilet device 100 to perform toilet flushing with a large flow volume (large flush). The small flush button 12k is a button for instructing the toilet device 100 to perform toilet flushing with a small flow volume (small flush). The remote control device 80 is substantially the same as the remote control device 10 of the above embodiment except for using a large flush button 12j and a small flush button 12k as operation buttons 12. Thus, the detailed description thereof is omitted.

When the toilet device 100 receives a wireless signal of large flush from the remote control device 80, the toilet device 100 performs large flush by opening e.g. an electromagnetic flush valve for a prescribed time. When the toilet device 100 receives a wireless signal of small flush from the remote control device 80, the toilet device 100 performs small flush by opening e.g. an electromagnetic flush valve for a prescribed time. The time for opening the electromagnetic valve for small flush is shorter than the time for opening the electromagnetic valve for large flush.

Thus, the function specified for the operation buttons 12 is not limited to the foregoing, but may be an arbitrary function necessary for remote control of the toilet device 100.

The above embodiment illustrates an integrated toilet device 100 in which the toilet stool 110 and the toilet seat unit 120 are integrated. The toilet seat unit 120 may be e.g. what is called a seat-type toilet seat unit attached removably to the toilet stool 110. In this case, the toilet seat unit may be regarded as the toilet device. In the case of providing only the large flush button 12*j* and the small flush button 12*k*, the toilet device may be e.g. a flush valve having a wireless transmission function.

In the above embodiment, the click mechanism 28 outputs a click feeling and a click sound. The click mechanism 28 may be e.g. a mechanism for outputting only a click feeling. In the above embodiment, the click mechanism 28 is shown as an output unit. The output unit may be e.g. a sound production mechanism for outputting only a sound. The sound production mechanism may be e.g. a loudspeaker for electronically outputting a sound, or a mechanism for mechanically outputting a sound. However, in view of power consumption, the sound production mechanism is preferably a mechanism for mechanically outputting a sound. As an alternative aspect, for instance, the toilet device 100 may output a sound in response to receiving a wireless signal from the remote control device. In this case, a vibration or sound does not necessarily need to be outputted on the remote control device side.

The embodiments of the invention have been described above. However, the invention is not limited to the above description. Those skilled in the art can suitably modify the above embodiments, and such modifications are also encompassed within the scope of the invention as long as they include the features of the invention. For instance, the shape, dimension, material, and layout of various components in e.g. the remote control device 10 are not limited to those illustrated, but can be suitably modified.

Furthermore, various components in the above embodiments can be combined with each other as long as technically feasible. Such combinations are also encompassed within the scope of the invention as long as they include the features of the invention.

What is claimed is:

1. A remote control device comprising:
   a plurality of operation buttons being movable between an ordinary position and a lowermost position and configured to move from the ordinary position to the lowermost position in response to a push operation;
   a plurality of detectors associated respectively with the operation buttons and configured to detect the respective push operation of the operation buttons;
   a power generator configured to generate a power in response to the push operation of one of the operation buttons;
   a controller driven by the power from the power generator, the controller being configured to determine the operation button pushed based on a detection result of each of the detectors, the controller remotely controlling a toilet device by transmitting a wireless signal toward the toilet device, the wireless signal corresponding to the determined operation button; and
   an output unit configured to produce an output when the power generator has generated the power, the output unit outputs a sound, wherein
   the toilet device includes a nozzle for jetting a water toward a human body private part, and
   the sound outputted by the output unit includes a frequency component having higher sound pressure than a sound during a toilet flushing of the toilet device and a jet sound of the nozzle.

2. The device according to claim 1, wherein the output unit outputs a click to the operation button pushed.

3. The device according to claim 1, wherein the detectors detect the push operation before power generation of the power generator, and do not send a notice when the push operation is detected.

4. The device according to claim 3, wherein
   the operation buttons have a detection position and a deactivation position,
   each of the detectors detects the push operation when each of the operation buttons is located at the detection position,
   each of the detectors deactivates the detection of the push operation when each of the operation buttons is located at the deactivation position, and
   the deactivation position is nearer to the ordinary position than the detection position in each of the detectors.

5. The device according to claim 1, wherein
   the operation buttons include a jet button for causing jetting from the nozzle and a stop button for stopping jetting from the nozzle.

* * * * *